(12) United States Patent
Perez Ruiz et al.

(10) Patent No.: US 11,739,777 B2
(45) Date of Patent: Aug. 29, 2023

(54) ALIGNMENT FEATURE FOR AN ELASTIC AVERAGING ALIGNMENT SYSTEM

(71) Applicant: GM GLOBAL TECHNOLOGY OPERATIONS LLC, Detroit, MI (US)

(72) Inventors: Alejandro Perez Ruiz, Warren, MI (US); Jeffrey M. Cullens, Franklin, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 741 days.

(21) Appl. No.: 16/710,685

(22) Filed: Dec. 11, 2019

(65) Prior Publication Data

US 2021/0180629 A1 Jun. 17, 2021

(51) Int. Cl.
*B60R 13/02* (2006.01)
*F16B 17/00* (2006.01)
*F16B 5/07* (2006.01)
*F16B 5/06* (2006.01)

(52) U.S. Cl.
CPC .............. *F16B 5/07* (2013.01); *F16B 5/0664* (2013.01); *B60R 13/0206* (2013.01)

(58) Field of Classification Search
CPC ..... F16B 5/065; F16B 5/0664; B60R 13/0206
See application file for complete search history.

(56) References Cited

U.S. PATENT DOCUMENTS

| | | | |
|---|---|---|---|
| 8,480,186 B2* | 7/2013 | Wang | H05K 5/0013 312/223.1 |
| 9,541,113 B2* | 1/2017 | Morris | F16B 19/02 |
| 9,618,026 B2* | 4/2017 | Morris | B23P 19/10 |
| 10,946,816 B2* | 3/2021 | Perez-Ruiz | B60R 13/0206 |
| 11,287,097 B1* | 3/2022 | Gallardo Amaya | H01R 12/7029 |
| 2014/0033493 A1* | 2/2014 | Morris | B23P 19/10 403/27 |
| 2014/0047691 A1* | 2/2014 | Colombo | B60R 13/005 269/47 |
| 2014/0220267 A1* | 8/2014 | Morris | B32B 7/05 428/33 |

(Continued)

FOREIGN PATENT DOCUMENTS

CN 104006045 A 8/2014

*Primary Examiner* — Robert Sandy
*Assistant Examiner* — Michael S Lee
(74) *Attorney, Agent, or Firm* — Cantor Colburn LLP

(57) ABSTRACT

A method of assembly includes forming a first member to include a plurality of elastically deformable locating protrusions extending outward from an exterior surface of the first member. A locating protrusion is an elongate member having an arcuate portion, a first linear leg portion extending from a first arc end, and a second leg portion extending from a second arc end. The method additionally includes forming a second member to include a plurality of elastically deformable compression features. The locating protrusions are inserted in press fit engagement with the plurality of compression features such that the first member and the second member are secured relative to each other and the average of the elastic deformation between all of the plurality of locating protrusions and all of the plurality of compression features precisely aligns the first member relative to the second member.

15 Claims, 3 Drawing Sheets

(56) References Cited

U.S. PATENT DOCUMENTS

2015/0375798 A1* 12/2015 Morris ................. F16B 5/0628
                                                                                     403/14
2019/0315290 A1* 10/2019 Shinohara ............ F16B 21/086

* cited by examiner

ALIGNMENT FEATURE FOR AN ELASTIC AVERAGING ALIGNMENT SYSTEM

INTRODUCTION

The present invention generally relates to a method of manufacturing an assembly for a vehicle, and more specifically to a method of using an average elastic deformation of elastically deformable features to secure and align a first member and a second member.

Currently, components, such as those found in motor vehicles and other manufactured vehicle items, as well, as those found in non-motor vehicle manufactured items, are mated together in a process and are mutually located with respect to each other by alignment features that are sized to provide spacing to freely move the components relative to one another to align them without creating an interference therebetween that would hinder the manufacturing process. There is a clearance between the male alignment features and their respective female alignment features which is predetermined to match anticipated size and positional variation tolerances of the male and female alignment features as a result of manufacturing (or fabrication) variances. As a result, significant positional variation can occur between the mated first and second components having the aforementioned alignment features, which may contribute to the presence of undesirably large variation in their alignment, particularly with regard to the gaps and spacing between them. When such misalignment occurs, it can negatively affect function and result in a perception of poor quality.

Thus, while current assemblies achieve their intended purpose, there is a need for a new and improved system and method for assembling two components.

SUMMARY

A method of assembly according to the present disclosure includes forming a first member to include a plurality of elastically deformable locating protrusions extending outward from an exterior surface of the first member. A respective locating protrusion of the plurality of locating protrusions is an elongate member having, in cross section, an arcuate portion extending from a first arc end to a second end, a first linear leg portion extending from the first arc end to a first free end, and a second leg portion extending from the second arc end to a second free end. The method additionally includes forming a second member to include a plurality of elastically deformable compression features. The method further includes inserting the plurality of locating protrusions in press fit engagement with the plurality of compression features such that the first member and the second member are secured relative to each other and the average of the elastic deformation between all of the plurality of locating protrusions and all of the plurality of compression features precisely aligns the first member relative to the second member.

In various embodiments, the first linear leg portion is parallel or not parallel to the second linear leg portion.

In an exemplary embodiment, the arcuate portion includes an outer periphery provided with at least one retention tab.

In an exemplary embodiment, forming the first member includes forming the plurality of locating protrusions integrally with the first member from a common material, which may be a polymeric material.

An assembly according to the present disclosure includes a first member and a second member. The first member has a first surface and a plurality of elastically deformable locating protrusions extending outward from an exterior surface of the first member. A respective locating protrusion of the plurality of locating protrusions is an elongate member having, in cross section, an arcuate portion extending from a first arc end to a second end, a first linear leg portion extending from the first arc end to a first free end, and a second leg portion extending from the second arc end to a second free end. The second member has a plurality of elastically deformable compression features. Respective protrusions of the plurality of locating protrusions are in press fit engagement with the plurality of compression features such that the first member and the second member are secured relative to each other and the average of the elastic deformation between all of the plurality of locating protrusions and all of the plurality of compression features precisely aligns the first member relative to the second member.

In a first exemplary embodiment, the first linear leg portion is parallel to the second linear leg portion. In a second exemplary embodiment, the first linear leg portion is not parallel to the second linear leg portion.

In an exemplary embodiment, the arcuate portion includes an outer periphery provided with at least one retention tab.

In an exemplary embodiment, the plurality of locating protrusions are integral with and have a common material composition with the first member. The common material composition may include a polymeric material.

An automotive vehicle according to the present disclosure includes a first component and a second component. The first component has a first surface and a plurality of elastically deformable locating protrusions extending outward from an exterior surface of the first component. A respective locating protrusion of the plurality of locating protrusions is an elongate component having, in cross section, an arcuate portion extending from a first arc end to a second end, a first linear leg portion extending from the first arc end to a first free end, and a second leg portion extending from the second arc end to a second free end. The second component has a plurality of elastically deformable compression features. Respective protrusions of the plurality of locating protrusions are in press fit engagement with the plurality of compression features such that the first component and the second component are secured relative to each other and the average of the elastic deformation between all of the plurality of locating protrusions and all of the plurality of compression features precisely aligns the first component relative to the second component.

In a first exemplary embodiment, the first linear leg portion is parallel to the second linear leg portion. In a second exemplary embodiment, the first linear leg portion is not parallel to the second linear leg portion.

In an exemplary embodiment, the arcuate portion includes an outer periphery provided with at least one retention tab.

In an exemplary embodiment, the plurality of locating protrusions are integral with and have a common material composition with the first component. The common material composition may include a polymeric material.

Embodiments according to the present disclosure provide a number of advantages. For example, the present disclosure provides an elastic averaging assembly capable of providing desired stiffness characteristics in conjunction with a larger slot, and moreover does so while maintaining acceptable overall dimensions.

The above advantage and other advantages and features of the present disclosure will be apparent from the following detailed description of the preferred embodiments when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
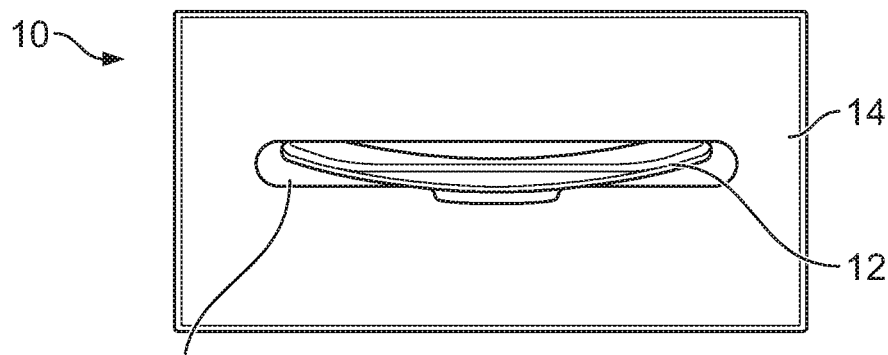
FIG. 1 is a top view of a prior art elastic averaging assembly.
Figure 2:
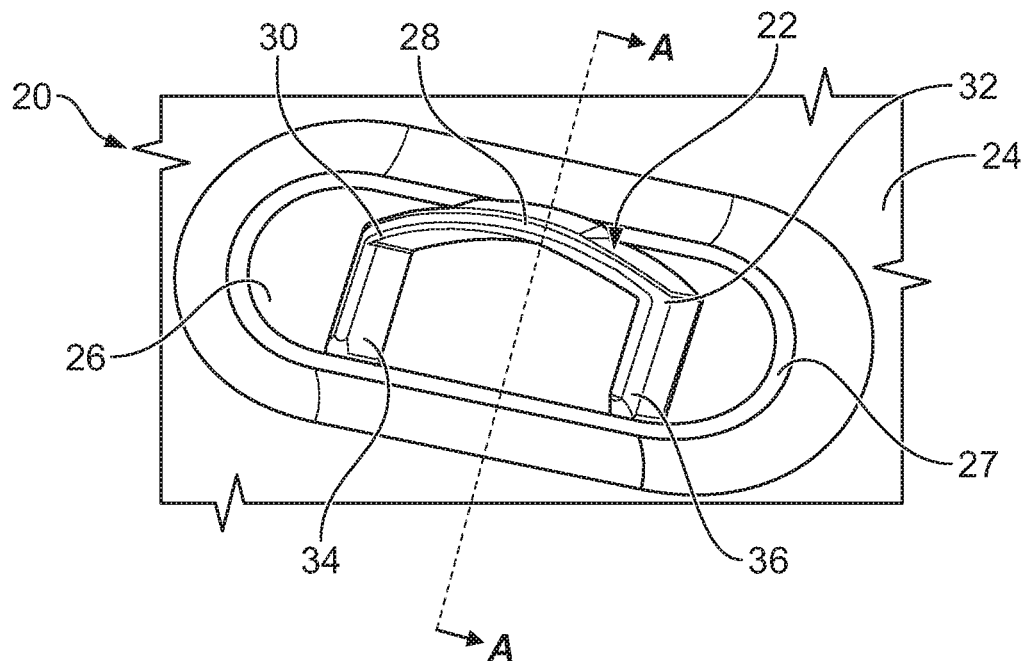
FIG. 2 is a first isometric top view of an elastic averaging assembly according to an embodiment of the present disclosure.
Figure 3:
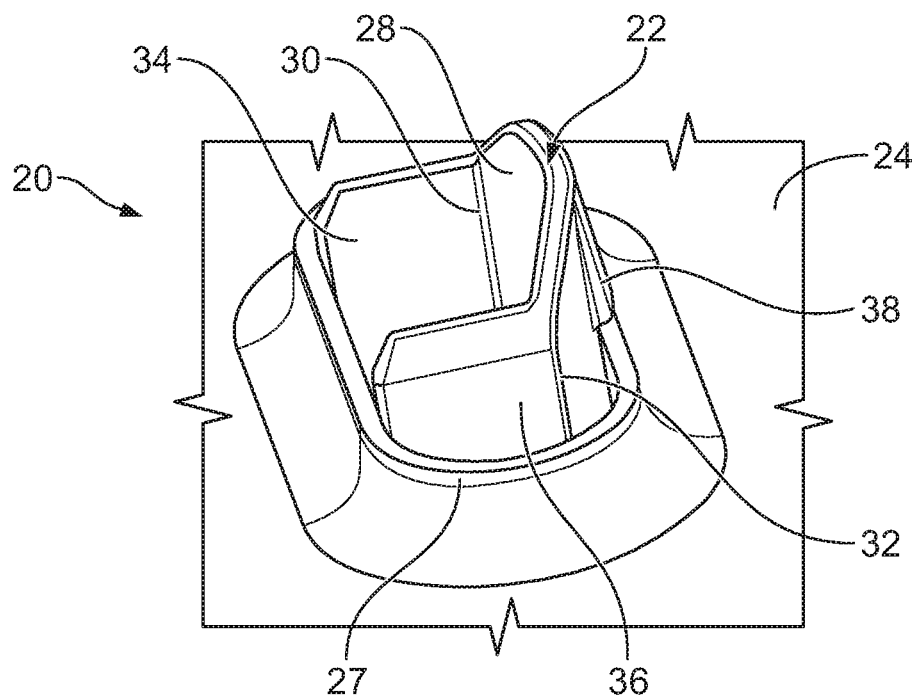
FIG. 3 is a second isometric top view of an elastic averaging assembly according to an embodiment of the present disclosure.
Figure 4:
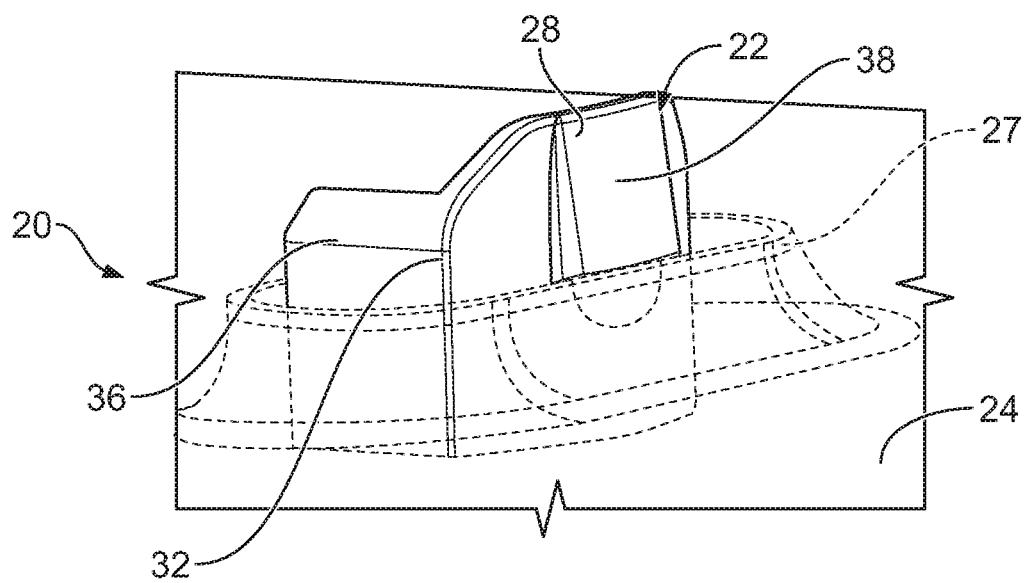
FIG. 4 is a third isometric top view of an elastic averaging assembly according to an embodiment of the present disclosure.

Referring now to FIG. 1, a known elastic averaging assembly 10 is shown. The assembly 10 includes a first component 12 and a second component 14. The first component 12 includes an elongate member with a generally arcuate profile. The first component 12 is inserted through a slot 16 of the second component 14 to join or mate the two components together. The first component 12 is oversized relative to the slot 16 such that as the first component 12 is inserted into the slot 16, the first component 12 and second component 14 elastically deform for elastic averaging coupling between the components 12, 14.

However, for some configurations and/or materials, known elastic averaging assemblies may provide packaging challenges. As an example, some materials have manufacturing tolerances which require relatively large slots, e.g. with a width greater than approximately 2.5 mm. As used herein, width refers to the smallest dimension of the slot. Known elastic averaging profiles, e.g. the arcuate profile illustrated in FIG. 1, would become undesirably wide and/or stiff when scaled to fit in slots of such widths.

Referring now to FIGS. 2-5, an elastic averaging assembly 20 is shown according to an embodiment of the present disclosure. The assembly 20 includes a first component 22 and a second component 24. While only one first component 22 and one second component 24 are illustrated herein, the assembly 20 may comprise a plurality of first components 22 and second components 24. Elastic averaging represents a subset of surface coupling types where improved accuracy is derived from the averaging of error over a large number of contacting surfaces. Elastic averaging is based on significantly over-constraining a solid body with a large number of relatively compliant members. As the components are preloaded, the elastic properties of the components allow for the size and position error of each individual contact feature to be averaged out over the sum of contact features throughout the solid body. In a well-designed and preloaded elastic averaging coupling, the repeatability is approximately inversely proportional to the square root of the number of contact points.

Figure 5:
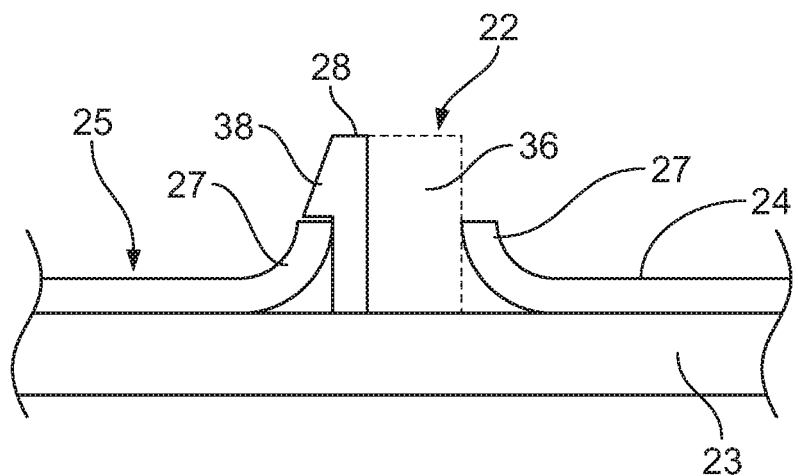
FIG. 5 is a view along section A-A in FIG. 2.

The first component 22 defines an elongate member extending from a body 23. In an exemplary embodiment, the first component 22 and body 23 are integrally formed of a common material, e.g. a polymeric material. However, in other embodiments, the first component 22 and body 23 may be formed of separate materials. The body 23 may be a generally planar body as illustrated in FIG. 5, or may take any other suitable shape according to the desired configuration. In an exemplary embodiment, the second component 24 comprises metal, e.g. sheet metal. However, in other embodiments the second component 24 may be formed of other materials. The second component 24 may be a generally planar body as illustrated in FIG. 5, or may take any other suitable shape according to the desired configuration.

The first component 22 has a profile with an arcuate portion 28 extending from a first arc end 30 to a second arc end 32. A first linear leg portion 34 extends from the first arc end 30, and a second linear leg portion 36 extends from the second arc end 32. In the illustrated embodiment the leg portions 34, 36 are parallel with one another; however, in other embodiments the leg portions 34, 36 are not parallel, as will be discussed in further detail below. In the illustrated embodiment the arcuate portion 28 is provided with at least one retention tab 38 on an outer surface thereof; other embodiments, however, may omit such a feature.

The first component 22 is inserted through a slot 26 of the second component 24 to join or mate the two components together. In the illustrated embodiment, the second component 24 is provided with a flange 27 extending from a lower surface 25 of the second component 24 about the periphery of the slot 26. In such an embodiment, the flange 27 may guide the first component 22 to a desired position and orientation relative to the slot 26 and facilitate insertion thereto. However, other embodiments may omit the flange 27.

The first component 22 is oversized relative to the slot 26 such that as the first component 22 is inserted into the slot 26, an interference occurs between the arcuate portion 28 and the slot 26. Upon further insertion, the first component 22 and second component 24 elastically deform for elastic averaging coupling between the components 22, 24. Upon full insertion, the retention tab 38 engages with the slot 26, e.g. via the flange 27, to secure the first and second components in the desired position relative to one another.

Figure 6:
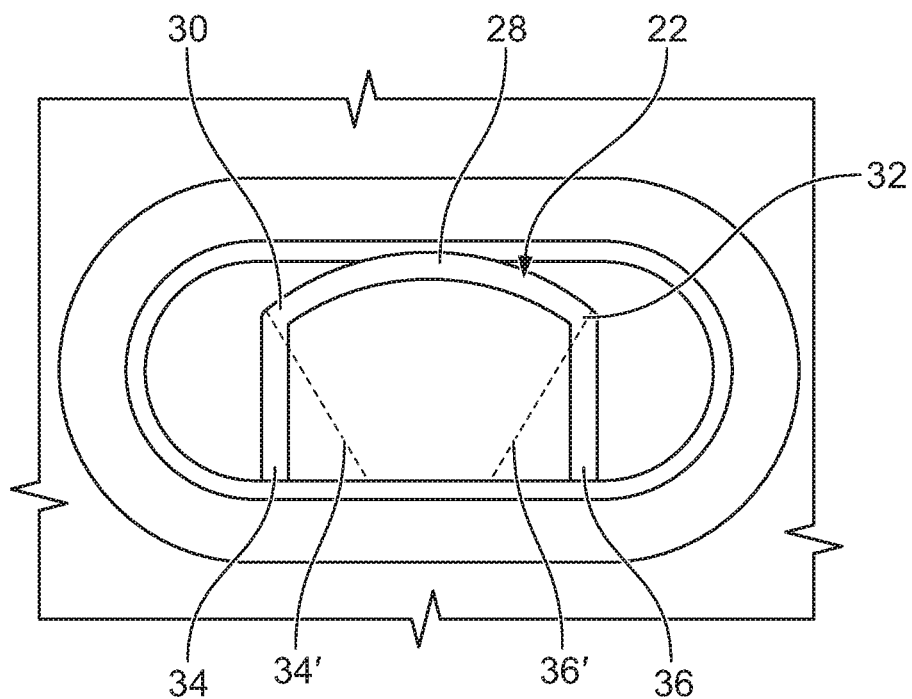
FIG. 6 is a top view depicting alternative arrangements for elastic averaging assemblies according to embodiments of the present disclosure.

While FIGS. 2-5 depict the leg portions 34, 36 as parallel, in other embodiments the leg portions 34, 36 may be provided in a non-parallel configuration. As shown in FIG. 6, legs 34', 36' may be provided in a non-parallel orientation.

In such embodiments, the cant angle of the legs 34', 36' relative to the arcuate portion 28 may be selected to provide a desired stiffness characteristic of the first component 22.

As may be seen, the present disclosure provides an elastic averaging assembly capable of providing desired stiffness characteristics in conjunction with a larger slot, and moreover does so while maintaining acceptable overall dimensions.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of assembly comprising:
   forming a first member to include a plurality of elastically deformable locating protrusions extending outward from an exterior surface of the first member, a respective locating protrusion of the plurality of locating protrusions being an elongate member having, in cross section, an arcuate portion having an arcuate outer surface and an arcuate inner surface extending from a first arc end to a second arc end, a first linear leg portion extending from the first arc end to a first free end, and a second leg portion extending from the second arc end to a second free end;
   forming a retention tab on the arcuate outer surface of the arcuate portion, the retention tab being confined to the arcuate outer surface;
   forming a second member to include a plurality of elastically deformable compression features, each of the elastically deformable compression features defining a slot having a peripheral edge; and
   inserting the plurality of locating protrusions in press fit engagement with the plurality of compression features such that the retention tab only engages a portion of the peripheral edge of the slot defined in the second member causing the first member and the second member to be adjustably secured relative to each other and the average of the elastic deformation between all of the plurality of locating protrusions and all of the plurality of compression features precisely aligns the first member relative to the second member.

2. The method of claim 1, wherein the first linear leg portion is parallel to the second linear leg portion.

3. The method of claim 1, wherein the first linear leg portion is not parallel to the second linear leg portion.

4. The method of claim 1, wherein forming the first member includes forming the plurality of locating protrusions integrally with the first member from a common material.

5. The method of claim 4, wherein the common material comprises a polymeric material.

6. An assembly comprising:
   a first member having a first surface and a plurality of elastically deformable locating protrusions extending outward from an exterior surface of the first member, a respective locating protrusion of the plurality of locating protrusions being an elongate member having, in cross section, an arcuate portion having an arcuate outer surface and an arcuate inner surface extending from a first arc end to a second arc end, a first linear leg portion extending from the first arc end to a first free end, and a second leg portion extending from the second arc end to a second free end, and a retention tab formed on the arcuate outer surface of the arcuate portion, the retention tab being confined to the arcuate outer surface; and
   a second member having a plurality of elastically deformable compression features, each of the elastically deformable compression features defining a slot having a peripheral edge, wherein respective protrusions of the plurality of locating protrusions are in press fit engagement with a portion of the peripheral edge of the slot defining each of the plurality of compression features such that the first member and the second member are adjustably secured relative to each other and the average of the elastic deformation between all of the plurality of locating protrusions and all of the plurality of compression features precisely aligns the first member relative to the second member.

7. The assembly of claim 6, wherein the first linear leg portion is parallel to the second linear leg portion.

8. The assembly of claim 6, wherein the first linear leg portion is not parallel to the second linear leg portion.

9. The assembly of claim 6, wherein the plurality of locating protrusions are integral with and have a common material composition with the first member.

10. The assembly of claim 9, wherein the common material composition comprises a polymeric material.

11. An automotive vehicle comprising:
    a first component having a first surface and a plurality of elastically deformable locating protrusions extending outward from an exterior surface of the first component, a respective locating protrusion of the plurality of locating protrusions being an elongate component having, in cross section, an arcuate portion having an arcuate outer surface and an arcuate inner surface extending from a first arc end to a second arc end, a first linear leg portion extending from the first arc end to a first free end, and a second leg portion extending from the second arc end to a second free end, and a retention tab formed on the arcuate outer surface of the arcuate portion the retention tab being confined to the arcuate outer surface; and
    a second component having a plurality of elastically deformable compression features each of the elastically deformable compression features defining a slot having a peripheral edge, wherein respective protrusions of the plurality of locating protrusions are in press fit engagement with a portion of the peripheral edge of the slot defining each of the plurality of compression features such that the first component and the second component are adjustably secured relative to each other and the average of the elastic deformation between all of the plurality of locating protrusions and all of the plurality of compression features precisely aligns the first component relative to the second component.

12. The vehicle of claim 11, wherein the first linear leg portion is parallel to the second linear leg portion.

13. The vehicle of claim 11, wherein the first linear leg portion is not parallel to the second linear leg portion.

14. The vehicle of claim 11, wherein the plurality of locating protrusions are integral with and have a common material composition with the first component.

15. The vehicle of claim 14, wherein the common material composition comprises a polymeric material.

* * * * *